United States Patent [19]

Zarchy et al.

[11] 4,225,323
[45] Sep. 30, 1980

[54] IONIZATION EFFECTED REMOVAL OF ALKALI COMPOSITION FROM A HOT GAS

[75] Inventors: Andrew S. Zarchy, Ballston Lake; Shiro G. Kimura, Schenectady, both of N.Y.

[73] Assignee: General Electric Company, Schenectady, N.Y.

[21] Appl. No.: 44,314

[22] Filed: May 31, 1979

[51] Int. Cl.² .............................................. B03C 1/00
[52] U.S. Cl. ........................................ 55/11; 55/138; 55/150; 55/135; 422/174; 361/230
[58] Field of Search ..................... 55/2, 11, 128–131, 55/135, 136, 138, 150; 361/230; 422/174, 175, 173; 60/275

[56] References Cited

U.S. PATENT DOCUMENTS

| | | | |
|---|---|---|---|
| 3,071,449 | 1/1963 | Shustack | 422/173 |
| 3,180,083 | 4/1965 | Heller | 422/186 |
| 3,276,202 | 10/1966 | Gary | 60/275 |
| 3,620,008 | 11/1971 | Newbold | 60/257 |
| 4,162,404 | 7/1979 | Fite et al. | 250/423 R |

OTHER PUBLICATIONS

Hughes et al., Methods of Experimental Physics, vol. 4, pp. 393–397, Acedemic Press, (1967).

*Primary Examiner*—Bernard Nozick
*Attorney, Agent, or Firm*—Richard G. Jackson; James C. Davis, Jr.; Paul R. Webb, II

[57] ABSTRACT

A process for ionization-effected removal of alkali composition from an ultrahigh temperature gaseous mixture containing the composition in vapor form is described. A flow of the hot gaseous mixture is conducted through a flow-through network in intimate contact with a metalliferous surface having a work function of at least 5.3 electron volts. The mixture heats the surface to the requisite temperature for effecting substantial alkali metal ionization. The resulting ions are removed by passing the resulting mixture containing same along a flow path through the lines of force of an electrical field of sufficiently low voltage to avoid both glow discharge and breakdown discharge. The lines of force extend to an electrically conductive ion-collection surface maintained at a sufficiently low temperature such that the ions are retained on the latter surface as a condensed phase.

8 Claims, 4 Drawing Figures

IONIZATION EFFECTED REMOVAL OF ALKALI COMPOSITION FROM A HOT GAS

BACKGROUND OF THE INVENTION

The present invention relates to a process and apparatus for ionization effected removal of alkali composition from an ultrahigh temperature gaseous mixture containing the composition in vapor form.

There are numerous instances where gases contain alkali composition vapor, which is desired to be removed from the gas or gaseous mixture. For example, in systems such as power plants including a gas turbine, it has been proposed to use gaseous products of combustion of coal or residual oil, of gaseous products produced by gasification of coal, etc. as the motive fluid for operating the gas turbine. One of the problems facing use of such gas for operating the gas turbine is that the gas contains alkali composition vapor, which—if not removed prior to entry into the turbine—is found to condense on working surfaces thereof with resulting detrimental effects (e.g. corrosion) on such surfaces and their underlying structure.

It has now been found by practice of the present invention that alkali composition can be removed from ultrahigh temperature gas or gaseous mixtures containing the composition in vapor form by surface catalyzed ionization of the alkali composition (e.g. alkali metal), followed by collection of the ionized alkali composition.

DESCRIPTION OF THE INVENTION

Generally stated, in one aspect the present invention provides a process for removing at least a portion of the amount of an alkali metal present in a gaseous mixture including an ionizable vapor composition containing the alkali metal in chemically combined or uncombined form. The process comprises providing a flow-through network defining a plurality of holes extending therethrough with a portion of a continuous or discontinuous metalliferous surface bordering at least a portion of each hole. The metalliferous surface has a work function of at least 5.3 electron-volts for catalytically ionizing alkali metal atoms. The metalliferous surface is heated to a temperature at least equal to the minimum temperature thereof at which, when atoms of said alkali metal are striking said metalliferous surface and equilibrium is established thereon, the ratio $n_i/n_a$ is at least 9:1 where $n_i$ and $n_a$ are the number of ions and number of atoms, respectively, of the alkali metal being emitted from the surface. While maintaining the metalliferous surface at such temperature, a flow of the gaseous mixture is conducted through at least a substantial fraction of the surface-bordered holes and in intimate contact with the metalliferous surface.

The ratio of the volumetric flow rate of the flow to the area of the metalliferous surface is sufficiently low such that a substantial portion of the ionizable vapor composition is catalytically ionized to form a second gaseous mixture including positive ions selected from the group consisting of ions of the alkali metal per se and positive ions including the alkali metal as a moiety thereof. An electric field is established within an ion-collection zone having an electrically conductive ion-collection surface. The field has lines of force extending transversely through a gas flow path within the zone to the ion-collection surface and a potential of at least +200 volts.

Prior to substantial neutralization of the ions within the second mixture and while maintaining the electric field, the second mixture is passed along the flow path and through the lines of force to deposit and neutralize at least a portion of the ions of the ion-collection surface. While passing the second mixture along the flow path, the collection surface is maintained at a temperature sufficiently low such that a substantial portion of the deposited and neutralized ions are retained on the ion-collection surface as a condensed phase.

Generally stated, in another aspect this invention provides an apparatus in which the above-described process can be performed.

BRIEF DESCRIPTION OF THE DRAWING

This invention will be better understood from the following detailed description taken with the accompanying drawing wherein the best mode contemplated for carrying out the invention is illustrated.

In the drawing, wherein like numerals refer to similar elements throughout.

DETAILED DESCRIPTION OF THE INVENTION AND MANNER AND PROCESS OF MAKING AND USING IT

Figure 1:
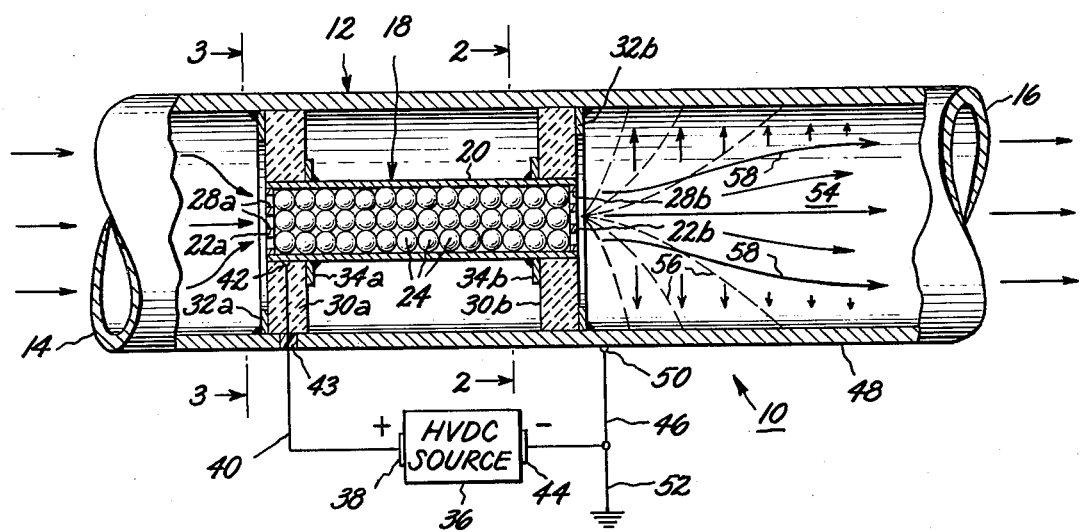
FIG. 1 is an elevation view, partly in section, of a removal device in accordance with a preferred embodiment of this invention.
Figure 2:
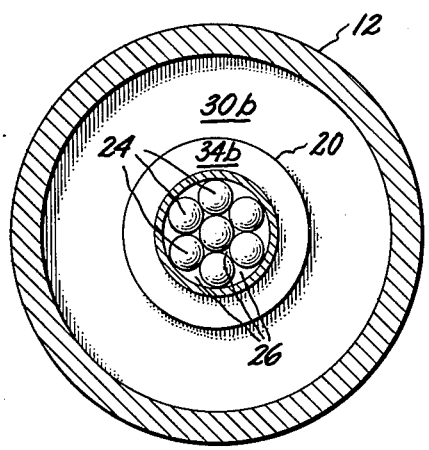
FIG. 2 is a sectional view taken on line 2—2 of FIG. 1.
Figure 3:
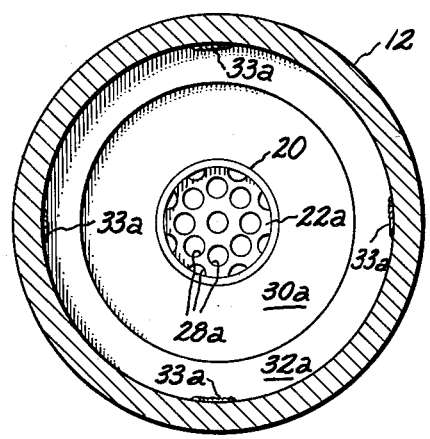
FIG. 3 is a sectional view taken on line 3—3 of FIG. 1.

Referring now to the drawing and especially FIGS. 1-3, there is illustrated alkali metal removal system 10 including pipe section 12 having an inlet end 14 and an outlet end 16 for conducting a flow of ultrahigh temperature gaseous mixture containing alkali composition in vapor form. Disposed coaxially of the pipe section is ionization assembly 18 including electrically conductive solid wall or sleeve 20, which preferably is of cylindrical metallic construction. The sleeve is closed at its inlet end and outlet end by perforated plates 22a and 22b, respectively, the plates preferably being of electrically conductive metallic construction. The plates are secured to the sleeve by any suitable means, e.g. welds (not shown). The sleeve contains a plurality of particles 24 arranged in random or regular distribution so as to define a flow-through network having a plurality of tortuous flow paths 26 formed by the interconnected voids adjoining the particles. The flow paths extend from plate 22a to plate 22b in flow communication with holes 28a and 28b provided through the respective plates. The perforated plate holes must be smaller in diameter than the diameter of the particular particles 24 employed. At least the surface of each particle is a continuous or discontinuous metalliferous surface of a material having a work function ($\Phi$) of at least 5.3 ev (electron-volts) for ionizing alkali metal atoms.

The material forming the metalliferous surface may be of metal, metal oxide, or metal alloy provided that the material has a work function of at least 5.3 ev. Suitable materials include, for example, platinum (Pt), tungsten (W), rhenium (Re), palladium (Pd), and oxides and alloys of the foregoing which have the requisite minimum work function. Platinum is preferred. For best results, the platinum should be substantially free of alkali metals, e.g. less than 0.5% by weight alkali metal.

Figure 4:
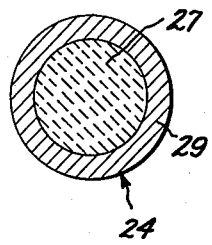
FIG. 4 is a sectional view taken through a particle having a coating of platinum thereon.

Preferably, at least a substantial portion of the surface of each particle is of the metalliferous material. A representative preferred particle, illustrated in FIG. 4, has a generally spherical shape and includes refractory oxide core 27 (preferably of alumina) having substantially continuous platinum coating 29 thereon. Employment of a plurality of particles of such construction advantageously provides a substantially large area of metalliferous surface bordering the path-defining voids or holes between the particles.

The sleeve 20 is carried at opposite ends thereof by a pair of electrically insulating support disks or rings 30a and 30b, which are preferably formed of ceramic although other materials having high electrical resistance may be employed. The support rings are secured to the sleeve in any suitable manner, e.g. pressure fitting. Retaining rings 32a and 32b (preferably of metal) are disposed upstream and downstream respectively relative to supports 30a and 30b in face-to-face contact therewith. These rings are secured to the pipe (as by welds 33a shown for ring 32a) to prevent displacement of the ionization assembly longitudinally of the pipe as by flow of the alkali-containing gas therethrough.

Optionally included additional retaining rings 34a and 34b may be disposed downstream and upstream relative to the support rings 30a and 30b, respectively, each additional retaining ring being in face-to-face contact with one of the insulating support rings. Where included each additional retaining ring is preferably formed of metal, welded to the sleeve, and spaced radially inwardly from the pipe. The additional rings aid in securing the sleeve to the insulating support rings.

HVDC source 36 (a high voltage direct-current source) is electrically connected at positive end 38 thereof via lead 40 to any suitable portion of the sleeve 20, which is electrically connected to the lead as by solder junction 42. The lead 40 extends through an electrically insulating bushing 43, preferably of ceramic, provided in a hole extending through the pipe. The bushing serves both to electrically insulate the lead from the pipe and form a substantially gas-tight seal. The HVDC source is connected at its negative end 44 through an additional electrical lead 46 to portion 48 of the pipe via a suitable connection 50 (e.g. silver solder). Lead 46 preferably includes branch 52 for electrically connecting this lead to ground.

The HVDC source is adapted to provide an output voltage of from about 200 volts or less to about 1000 volts or more, preferably from about 300 to about 900 volts, e.g., about 600 volts. When energized, the HVDC source develops a high-voltage electrical field within the ion-collection cavity or zone 54 bordered cylindrically by the pipe portion 48 disposed downstream from the ionization assembly 18. The field has lines of force (schematically shown by broken lines 56 in FIG. 1) from the perforated plate 22b through the gas flow path (schematically shown by arrows 58) to the electrically conductive ion-collection surface defined by the inner surface of the metal pipe portion 48. This field affects alkali-metal-containing positive ions generated from alkali metal atoms or other alkali-metal-containing ionizable species which are contacted with the mettaliferous surface of the ionization assembly by flow of gas containing same therethrough while the last-mentioned surface is maintained at the above-described temperature. The field effects deposition and neutralization of at least a portion of such ions on the ion-collection surface.

Although the portion of the pipe upstream of pipe portion 48 may be provided with thermal insulation (not shown), the pipe portion 48 preferably is free of such insulation so that the ion-collection surface is adapted to be maintained at a temperature sufficiently low such that at least a substantial portion of the ions deposited and neutralized thereon are retained thereon in a condensed (e.g. liquid or solid) phase. Maintenance of such temperature conveniently can be effected by use of the apparatus in air (or other suitable environments) at moderate temperatures, e.g. 0°–100° F., whereby the air cools the pipe portion 48. If desired, pipe portion 48 may be provided with a cooling means, e.g. a jacket through which a cooling medium such as air, water, or the like is flowed, to provide further control of the temperature of the ion-collection surface.

In performing the process of this invention using the apparatus 10, a flow of an ultrahigh temperature gaseous mixture containing alkali metal composition in vapor form is conducted through at least a portion of the flow paths 26 by introducing the mixture via the pipe inlet 14 through holes 28a in plate 22a.

The apparatus and process have particular application to removing alkali metals present in gas streams obtained by combustion of hydrocarbon-containing fuels (e.g. coal, residual oil, gasified coal, etc.), in chemically-uncombined form (e.g. atomic form) and in chemically-combined form (e.g. alkali metal salts such as, for example, the carbonates, chlorides, and sulfates) in amounts corresponding to from about 1 to about 5000 parts per billion by weight of alkali metal per se in the flowing gas mixture.

Such gas streams are typically available at an ultrahigh temperature in the range from about 1300° F. to about 1800° F. Thus, they will heat the metalliferous surface to a temperature at least equal to the minimum temperature thereof at which, when atoms of the alkali metal are striking the metalliferous surface and equilibrium is established thereon, the ratio $n_i/n_a$ is at least 9:1 where $n_i$ and $n_a$ are the number of ions and number of atoms, respectively, of the alkali metal being emitted from such surface. For best results, the metalliferous surface is platinum and the gaseous mixture will be sufficiently hot to heat the metalliferous surface to at least 700° C. Continued flow of the ultrahigh temperature gaseous mixture serves to maintain the metalliferous surface at or above the preferred minimum temperature described above. (Other suitable heat sources may be employed, if desired or necessary in a given application, for obtaining and/or maintaining the requisite surface temperature. A suitable heat source is a low-voltage direct current source of the type described by A. S. Zarchy in U.S. patent application Ser. No. 033,257, filed Apr. 25, 1979, assigned to the assignee hereof and incorporated herein by reference.)

While maintaining the metalliferous surface at the requisite temperature by whatever means or method employed, the sleeve 20 conducts the introduced flow through at least a substantial fraction of the surface-bordered holes and in intimate contact with the metalliferous surface.

The ratio of the volumetric rate of the flow to the area of the metalliferous surface is selected to be sufficiently low such that a substantial portion of the ionizable composition is catalytically ionized in the ionization assembly 18. Such ionization forms a second gaseous mixture including positive ions selected from the group consisting of the alkali metal and positive ions including the alkali metal as a moiety thereof.

The HVDC source is energized to develop and maintain the electric field (as described above) within the pipe portion 48 having a metallic electrically conductive inner surface which serves as the ion-collection surface. The pipe portion 48 serves as a flow conductor for conducting a confined flow of the second gaseous mixture along the flow path therethrough and away from the flow-through network of the ionization assembly. The close proximity of the ion-collection zone defined by the pipe portion 48 to the outlet of the ionization assembly aids in preventing any substantial neutralization of the ions within the second or modified gaseous mixture.

The second gaseous mixture is passed along the flow path within the ion-collection zone through the lines of force of the HVDC-developed electrical field described above, thereby effecting deposition and neutralization at least a portion of the ions on the inner surface of the pipe portion 48. Such inner surface is maintained at the sufficiently low temperature (e.g. 100° F. or less) such that at least a substantial portion of the ions deposited and neutralized on the ion-collection surface are retained thereon in a condensed phase.

The maximum potential of the electric field should be of sufficiently low voltage such that the gaseous mixture being treated does not undergo either glow discharge or breakdown discharge. As will be appreciated by those skilled in the art, the value of such voltage for a given gaseous mixture can be readily determined from observations of the mixture while gradually increasing the voltage.

The alkali metal which can be removed in accordance with the invention include those alkali metals having an ionization potential of less than the work function of the metalliferous surface material. Compounds of the foregoing alkali metals having such ionization potential can also be removed.

BEST MODE CONTEMPLATED

The best mode contemplated for carrying out this invention has been set forth in the description above, for example, by way of setting forth preferred structural arrangements, electrical characteristics, materials of construction, compositions and operating conditions, including but not limited to preferred ranges and values of amounts and other unobvious variables material to successfully practicing (including making and using the invention in the best way contemplated at the time of executing this patent application.)

It is understood that the foregoing detailed description is given merely by way of illustration and that many modifications may be made therein without departing from the spirit or scope of the present invention.

What is claimed is:

1. A process for removing at least a portion of the amount of an alkali metal present in a gaseous mixture including an ionizable vapor composition containing said alkali metal in chemically combined or uncombined form, comprising
   (a) providing a flow-through network defining a plurality of holes extending therethrough, a portion of a continuous or discontinuous metalliferous surface bordering at least a portion of each hole, said metalliferous surface having a work function of at least 5.3 electron-volts for ionizing alkali metal atoms,
   (b) heating said metalliferous surface to a temperature at least equal to the minimum temperature thereof at which, when atoms of said alkali metal are striking said metalliferous surface and equilibrium is established thereon, the ratio $n_i/n_a$ is at least 9:1 where $n_i$ and $n_a$ are the number of ions and number of atoms, respectively, and said alkali metal being emitted from said surface,
   (c) while maintaining said metalliferous surface at said temperature, conducting a flow of said gaseous mixture through at least a substantial fraction of the surface-bordered holes and in intimate contact with said metalliferous surface,
   the ratio of the volumetric flow rate of said flow to the area of said metalliferous surface being sufficiently low such that a substantial portion of said ionizable composition is catalytically ionized to form a second gaseous mixture including positive ions selected from the group consisting of said alkali metal and positive ions including said alkali metal as a moiety thereof,
   (d) developing an electric field within an ion-collection zone having an electrically conductive ion-collection surface, said field having lines of force extending transversely through a gas flow path within said zone to said ion collection surface, said electric field having a potential of at least +200 volts,
   (e) prior to substantial neutralization of the ions within said second mixture and while maintaining said electric field, passing said second mixture along said flow path and through said lines of force to deposit and neutralize at least a portion of said ions on said ion-collection surface, and
   (f) while passing said second mixture along said flow path, maintaining said collection surface at a temperature sufficiently low such that a substantial portion of the deposited and neutralized ions are retained on said ion-collection surface as a condensed phase,
   wherein the maximum potential of said electrical field is of sufficiently low voltage such that the gaseous mixture does not undergo either glow discharge or breakdown discharge.

2. The process of claim 1, wherein said potential is at least 600 volts.

3. The process of claim 1, wherein said metalliferous surface is maintained at a temperature of at least 700° C.

4. A process for removing at least a portion of the amount of an alkali metal present in a gaseous mixture including an ionizable vapor composition containing said alkali metal in chemically combined or uncombined form, comprising
   (a) providing a flow-through network defining a plurality of holes extending therethrough, a portion of a continuous or discontinuous metalliferous surface bordering at least a portion of each hole, said metalliferous surface having a work function of at least 5.3 electron-volts for ionizing alkali metal atoms,
   (b) heating said metalliferous surface to a temperature at least equal to the minimum temperature thereof at which, when atoms of said alkali metal are striking said metalliferous surface and equilibrium is established thereon, the ratio $n_i/n_a$ is at least 9:1 where $n_i$ and $n_a$ are the number of ions and number of atoms, respectively, and said alkali metal being emitted from said surface, (c) while maintaining said metalliferous surface at said temperature, conducting a flow of said gaseous mixture through at least a substantial fraction of the surface-bordered holes and in intimate contact with said metalliferous surface,
the ratio of the volumetric flow rate of said flow to the area of said metalliferous surface being sufficiently low such that a substantial portion of said ionizable composition is catalytically ionized to form a second gaseous mixture including positive ions selected from the group consisting of said alkali metal and positive ions including said alkali metal as a moiety thereof,
(d) developing an electric field within an ion-collection zone having an electrically conductive ion-collection surface, said field having lines of force extending transversely through a gas flow path within said zone to said ion collection surface, said electric field having a potential of at least +200 volts,
(e) prior to substantial neutralization of the ions within said second mixture and while maintaining said electric field, passing said second mixture along said flow path and through said lines of force to deposit and neutralize at least a portion of said ions on said ion-collection surface, and
(f) while passing said second mixture along said flow path, maintaining said collection surface at a temperature sufficiently low such that a substantial portion of the deposited and neutralized ions are retained on said ion-collection surface as a condensed phase,
wherein said flow-through network includes a plurality or particles, each particle including a core of refractory composition and a coating adhered to the surface of the core, said coating comprising platinum disposed at the surface of said particle, said holes being contiguous voids between adjacent particles.

5. An apparatus for removing at least a portion of the amount of an alkali metal present in a gaseous mixture including an ionizable vapor composition containing said alkali metal in chemically combined or uncombined form, comprising
(a) a flow-through network defining a plurality of holes extending therethrough, a portion of a continuous or discontinuous metalliferous surface bordering at least a portion of each hole, said metalliferous surface having a work function of at least 5.3 electron-volts for ionizing alkali metal atoms,
(b) said metalliferous surface being adapted to be heated to a temperature at least equal to the minimum temperature thereof at which, when atoms of said alkali metal are striking and metalliferous surface and equilibrium is established thereon, the ratio $n_i/n_a$ is at least 9:1 where $n_i$ and $n_a$ are the number of ions and number of atoms, respectively, of said alkali metal being emitted from said surface,
(c) first conducting means for conducting a flow of said gaseous mixture through at least a substantial fraction of the surface-bordered holes, in intimate contact with said metalliferous surface, and at a sufficiently low ratio of the volumetric flow rate of said flow to the area of said metalliferous surface such that a substantial portion of said ionizable composition is catalytically ionized while said surface is at said temperature to form a second gaseous mixture including positive ions selected from the group consisting of said alkali metal and positive ions including said alkali metal as a moiety thereof,
(d) second conducting means for conducting a confined flow of said second gaseous mixture along a flow path away from said flow-through network, said second conducting means including an electrically conductive ion-collection surface disposed in contact with said flow path,
(e) field-developing means for developing an electrical field within said second conducting means, said field having lines of force extending transversely through said flow path to said ion-collection surface to deposit and neutralize at least a substantial portion of said ions on said ion-collection surface, said field having a potential of at least +200 volts,
(f) said collection surface being adapted to be maintained at a temperature sufficiently low such that at least a substantial portion of the deposited and neutralized ions are retained thereon in a condensed phase,
wherein said flow-through network includes a plurality of particles, each particle including a core of refractory composition and a coating adhered to the surface of the core, said coating comprising platinum disposed at the surface of said particle, said holes being contiguous voids between adjacent particles.

6. An apparatus for removing at least a portion of the amount of an alkali metal present in a gaseous mixture including an ionizable vapor composition containing said alkali metal in chemically combined or uncombined form, comprising
(a) a flow-through network defining a plurality of holes extending therethrough, a portion of a continuous or discontinuous metalliferous surface bordering at least a portion of each hole, said metalliferous surface having a work function of at least 5.3 electron-volts for ionizing alkali metal atoms,
(b) said metalliferous surface being adapted to be heated to a temperature at least equal to the minimum temperature thereof at which, when atoms of said alkali metal are striking said metalliferous surface and equilibrium is established thereon, the ratio $n_i/n_a$ is at least 9:1 where $n_i$ and $n_a$ are the number of ions and number of atoms, respectively, of said alkali metal being emitted from said surface,
(c) first conducting means for conducting a flow of said gaseous mixture through at least a substantial fraction of the surface-bordered holes, in intimate contact with said metalliferous surface, and at a sufficiently low ratio of the volumetric flow rate of said flow to the area of said metalliferous surface such that a substantial portion of said ionizable composition is catalytically ionized while said surface is at said temperature to form a second gaseous mixture including positive ions selected from the group consisting of said alkali metal and positive ions including said alkali metal as a moiety thereof,
(d) second conducting means for conducting a confined flow of said second gaseous mixture along a flow path away from said flow-through network, said second conducting means including an electrically conductive ion-collection surface disposed in contact with said flow path,
(e) field-developing means for developing an electrical field within said second conducting means, said field having lines of force extending transversely through said flow path to said ion-collection surface to deposit and neutralize at least a substantial portion of said ions on said ion-collection surface, said field having a potential of at least +200 volts, (f) said collection surface being adapted to be maintained at a temperature sufficiently low such that at least a substantial portion of the deposited and neutralized ions are retained thereon in a condensed phase, and (g) means for controlling the field-developing means such that the maximum potential of said electrical field is of sufficiently low voltage such that the gaseous mixture does not undergo either glow discharge or breakdown discharge.

7. The apparatus of claim 6, further including means for maintaining said collection surface at a temperature sufficiently low such that a substantial portion of the deposited and neutralized ions are retained on said ion-collection surface as a condensed phase.

8. The apparatus of claim 6, wherein said metalliferous surface is platinum.

* * * * *